(12) United States Patent
Kageyama

(10) Patent No.: US 8,508,871 B2
(45) Date of Patent: Aug. 13, 2013

(54) LENS BARREL AND IMAGE CAPTURING APPARATUS

(75) Inventor: Motofusa Kageyama, Fujisawa (JP)

(73) Assignee: Nikon Corporation, Tokyo (JP)

(*) Notice: Subject to any disclaimer, the term of this patent is extended or adjusted under 35 U.S.C. 154(b) by 93 days.

(21) Appl. No.: 13/019,700

(22) Filed: Feb. 2, 2011

(65) Prior Publication Data

US 2011/0122519 A1 May 26, 2011

Related U.S. Application Data

(63) Continuation of application No. PCT/JP2009/003817, filed on Aug. 7, 2009.

(30) Foreign Application Priority Data

Aug. 8, 2008 (JP) .................................. 2008-205031

(51) Int. Cl.
*G02B 7/02* (2006.01)
*G02B 15/14* (2006.01)

(52) U.S. Cl.
USPC ........... 359/824; 359/822; 359/823; 359/814; 359/694

(58) Field of Classification Search
USPC .................. 359/814, 824, 826, 704, 696–703, 359/811, 822, 823, 825; 310/328, 12.21, 310/12.01; 396/55
See application file for complete search history.

(56) References Cited

U.S. PATENT DOCUMENTS

| | | | | |
|---|---|---|---|---|
| 5,515,210 A | * | 5/1996 | Devenyi .......................... | 359/823 |
| 5,796,186 A | * | 8/1998 | Nanba et al. ..................... | 310/14 |
| 5,859,733 A | * | 1/1999 | Miyano et al. ................. | 359/824 |
| 6,114,799 A | * | 9/2000 | Yoshida et al. ................. | 310/328 |
| 6,215,605 B1 | * | 4/2001 | Kuwana et al. ................. | 359/824 |
| 2007/0040481 A1 | * | 2/2007 | Ogino ............................. | 310/800 |
| 2007/0091463 A1 | * | 4/2007 | Paik et al. ....................... | 359/700 |

(Continued)

FOREIGN PATENT DOCUMENTS
JP 173714 * 5/1988
JP U-01-173714 12/1989

(Continued)

OTHER PUBLICATIONS

International Search Report issued in International Application No. PCT/2009/003817 dated Dec. 8, 2009 (with translation).

(Continued)

*Primary Examiner* — Thomas K Pham
*Assistant Examiner* — William M Johnson
(74) *Attorney, Agent, or Firm* — Oliff & Berridge, PLC

(57) ABSTRACT

Provided is a lens barrel comprising a lens holding member that holds a lens; a guide bar that has a magnetic pattern in which a pair of magnetic poles repeat in a longitudinal direction and that has the longitudinal direction thereof oriented in a direction of an optical axis of the lens to guide the lens holding section to move in the direction of the optical axis; a control portion that is disposed on an outer circumferential surface of the lens holding member and that includes a magnetic body generating magnetic force between itself and the magnetic pattern of the guide bar; and a drive coil that is arranged in a manner to not contact the guide bar and that generates magnetic drive force between itself and the guide bar.

10 Claims, 21 Drawing Sheets

(56) References Cited

U.S. PATENT DOCUMENTS

2008/0007842 A1* 1/2008 Otaka .......................... 359/696
2008/0084622 A1* 4/2008 Ishimoda et al. ............. 359/826
2008/0165440 A1* 7/2008 Aoshima ...................... 359/824

FOREIGN PATENT DOCUMENTS

| | | |
|---|---|---|
| JP | A-06-174998 | 6/1994 |
| JP | A-08-190041 | 7/1996 |
| JP | A-2006-251651 | 9/2006 |
| JP | 2008-197220 * | 8/2007 |
| JP | A-2008-015156 | 1/2008 |
| JP | A-2008-197220 | 8/2008 |
| JP | A-2008-216927 | 9/2008 |

OTHER PUBLICATIONS

Jul. 11, 2012 Office Action issued in Chinese Application No. 2009801300848 (with partial English translation).

* cited by examiner

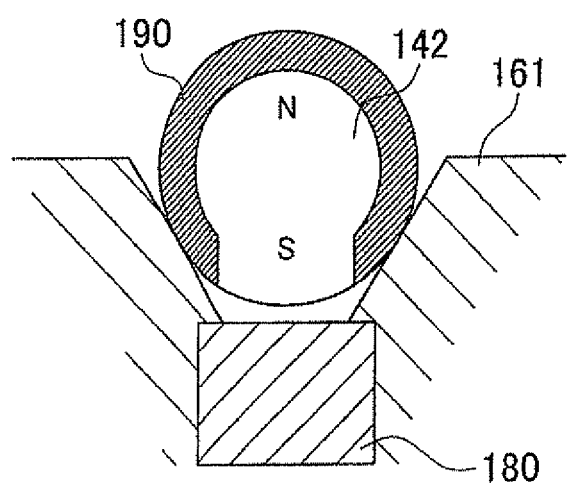
F I G . 13

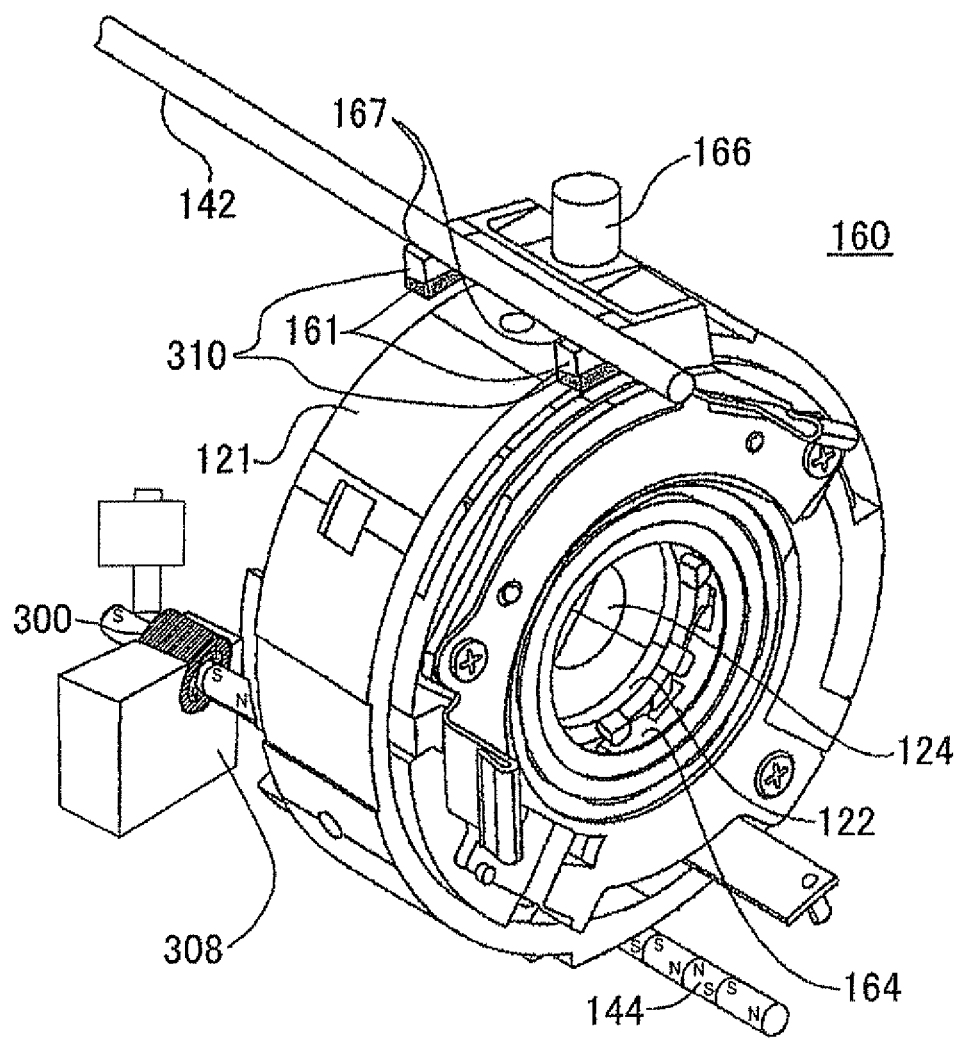
F I G. 18

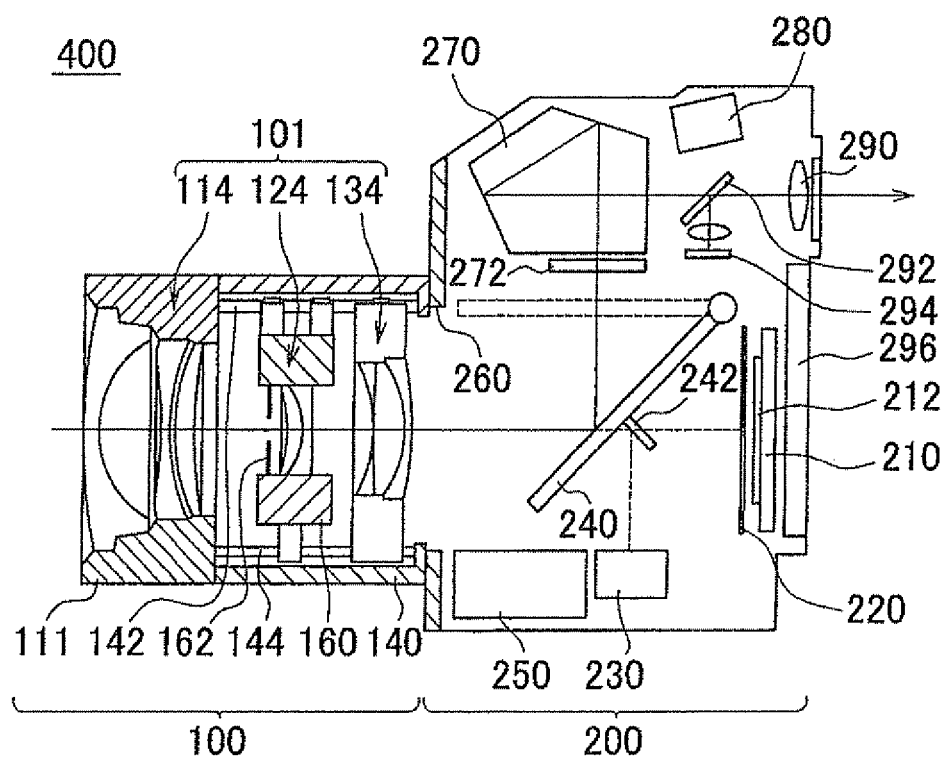
F I G . 21

LENS BARREL AND IMAGE CAPTURING APPARATUS

This is a Continuation of International Application No. PCT/JP2009/003817 filed Aug. 7, 2009, which claims the benefit of Japanese Patent Application No. 2008-205031 filed Aug. 8, 2008. The disclosure of the prior application is hereby incorporated by reference herein in its entirety.

BACKGROUND

1. Technical Field

The present invention relates to a lens barrel and an image capturing device. The contents of the following Japanese patent application are incorporated herein by reference,
  NO. 2008-205031 filed on Aug. 8, 2008

2. Related Art

A known lens barrel includes a guide bar that guides a lens to move in a certain direction and a lens frame that has a sleeve engaging with the guide bar to hold the lens, as shown in, for example, Japanese Patent Application Publication No. H06-174998. The sleeve includes a cam follower, and the lens frame is made to move along the optical axis of the lens by rotating a cam cylinder having a cam groove engaged with the cam follower.

This sleeve sets the position of the lens frame with respect to the guide bar, and slides along the guide bar. A gap is preferably formed between the sleeve and the guide bar such that the lens frame moves smoothly when sliding. When the lens frame is not moving, however, it is difficult to set the position of the lens frame relative to the guide bar because of this gap.

SUMMARY

To solve the above problem, according to a first aspect related to the innovations herein, provided is a lens barrel comprising a lens holding member that holds a lens; a guide bar that has a magnetic pattern in which a pair of magnetic poles repeat in a longitudinal direction and that has the longitudinal direction thereof oriented in a direction of an optical axis of the lens to guide the lens holding section to move in the direction of the optical axis; a control portion that is disposed on an outer circumferential surface of the lens holding member and that includes a magnetic body generating magnetic force between itself and the magnetic pattern of the guide bar; and a drive coil that is arranged in a manner to not contact the guide bar and that generates magnetic drive force between itself and the guide bar.

According to a second aspect related to the innovations herein, provided is a lens barrel comprising a lens holding member that holds a lens; a guide bar that includes a magnet in at least a portion thereof and that is oriented in a direction of an optical axis of the lens to guide the lens holding section to move in the direction of the optical axis; and a control portion that is disposed on the lens holding member, and that includes a non-magnetic contact surface that contacts a portion of an outer circumferential surface of the guide bar and a magnetic body generating magnetic force between itself and the magnet of the guide bar arranged at a position further from the guide bar than the contact surface.

According to a third aspect related to the innovations herein, provided is a lens barrel comprising a lens holding member that holds a lens; a guide bar that includes a magnet in at least a portion thereof and a coating portion covering at least a portion of an outer circumferential surface of the magnet with a non-magnetic material, and that is oriented in a direction of an optical axis of the lens to guide the lens holding section to move in the direction of the optical axis; and a control portion that is disposed on the lens holding member, that contacts the coating portion of the guide bar, and that includes a magnetic body generating magnetic force between the guide bar and the magnet.

According to a fourth aspect related to the innovations herein, provided is a lens barrel comprising a lens holding member that holds a lens; a guide bar arranged in a direction of an optical axis of the lens; and a control portion that controls a position of the lens holding member relative to the guide bar. In the lens barrel, the control portion includes a pair of contact surfaces that contact the guide bar, the contact surfaces are two surfaces that intersect at an angle to form a shape that is substantially V-shaped, one of the control portion and the guide bar includes a magnet, and the other of the control portion and the guide bar includes a magnet or a magnetic body.

According to a fifth aspect related to the innovations herein, provided is a lens barrel comprising a lens holding member that holds a lens; a guide bar arranged in a direction of an optical axis of the lens; and a control portion that includes a contact surface contacting the guide bar and that controls a position of the lens holding member relative to the guide bar contacting the contact surface. In the lens barrel, one of the control portion and the guide bar includes a magnet that has at least a portion thereof covered by a magnetic yoke, and the other of the control portion and the guide bar includes a magnet or a magnetic body.

According to a sixth aspect related to the innovations herein, provided is an image capturing device comprising the lens barrel described above.

The summary clause does not necessarily describe all necessary features of the embodiments of the present invention. The present invention may also be a sub-combination of the features described above.

BRIEF DESCRIPTION OF THE DRAWINGS

FIG. 13 is a schematic view showing another example of the magnetic configuration near the V-shaped groove control portion 161.

FIG. 18 is a perspective view showing another structure of the intermediate unit 160.

FIG. 21 is a schematic view of an image capturing device 400 provided with the lens barrel 100.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
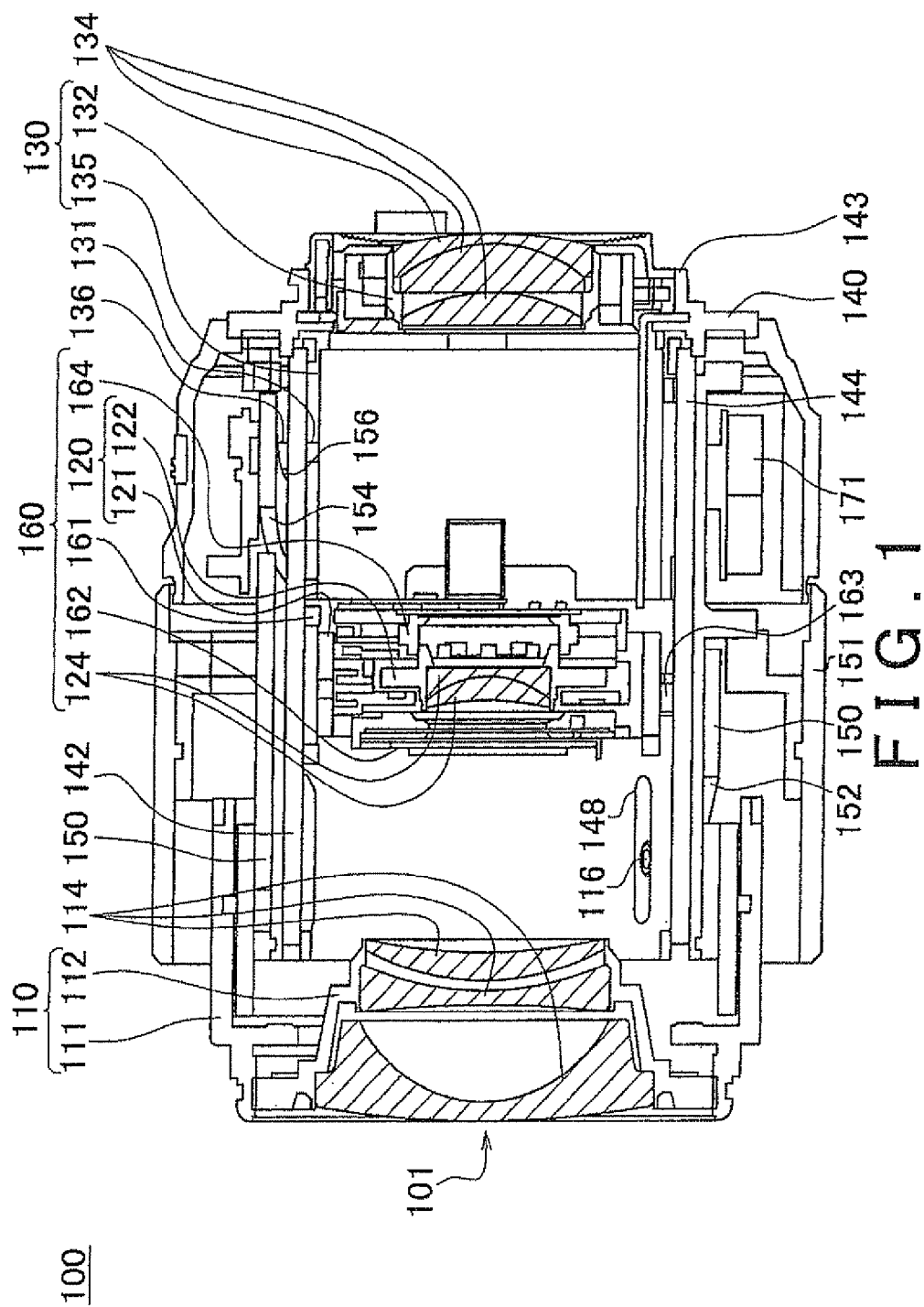
FIG. 1 is a cross-sectional view of an entire lens barrel 100.
Figure 2:
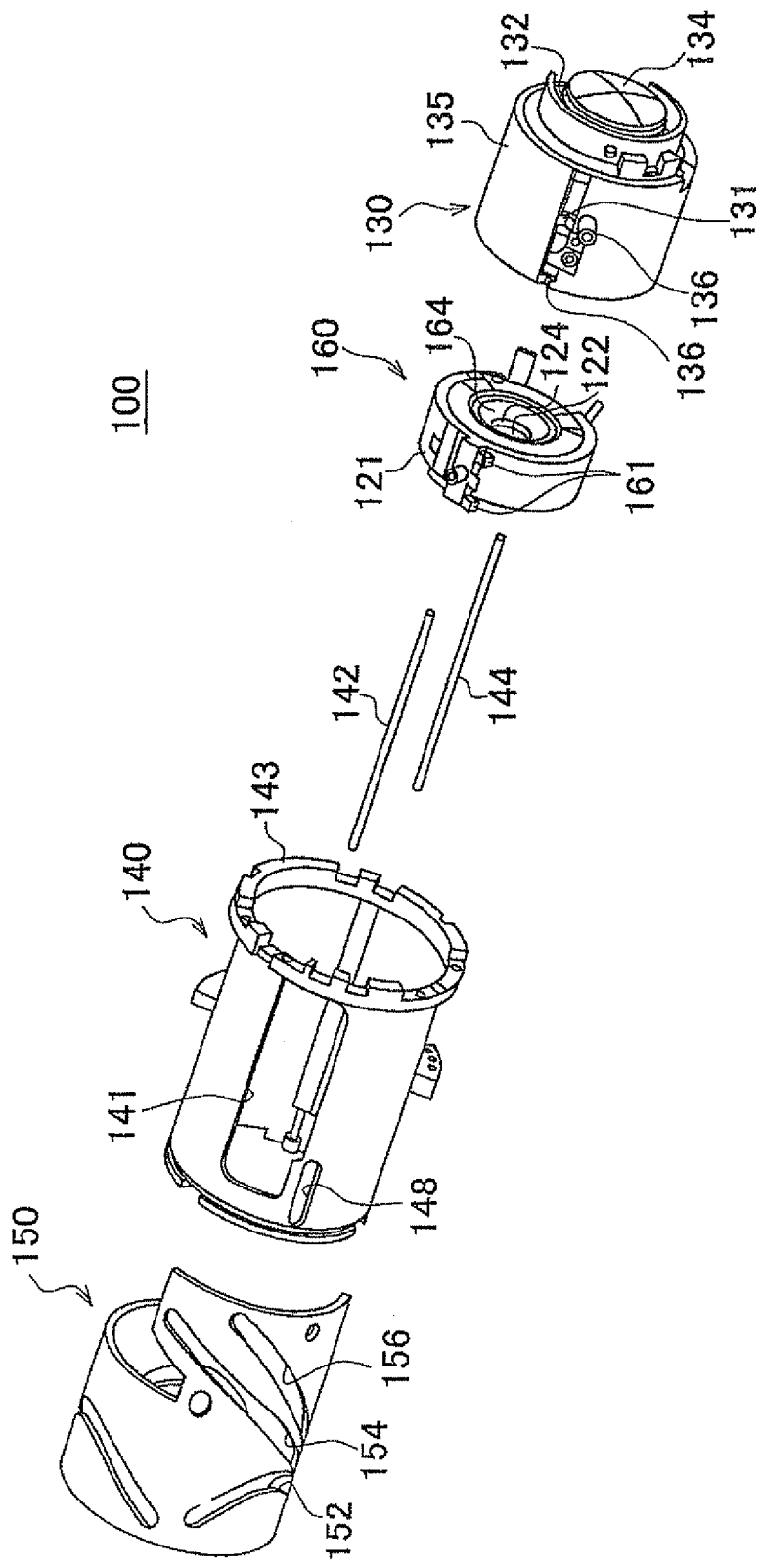
FIG. 2 is an exploded perspective view of the lens barrel 100.

FIG. 1 is a cross-sectional view of an entire lens barrel 100. FIG. 2 is an exploded perspective view of the lens barrel 100. The lens barrel 100 includes an optical system 101, a fixed cylinder 140, a cam cylinder 150, and three lens holding members 110, 120, and 130. The optical system 101 includes a first lens group 114, a second lens group 124, and a third lens group 134, which are held respectively by the lens holding members 110, 120, and 130.

The fixed cylinder 140 is connected to other components such as a camera body in a base 143, and does not move or pivot in the lens barrel 100. Guide bars 142 and 144 are formed parallel to each other in the fixed cylinder 140. The fixed cylinder 140 includes a linear groove section 148 formed parallel to the optical axis of the optical system 101.

The cam cylinder 150 is attached outside the fixed cylinder 140 and includes cam groove sections 152, 154, and 156. The cam groove sections 152, 154, and 156 are formed at an angle relative to the optical axis of the optical system 101. The cam cylinder 150 rotates on the same axis as the fixed cylinder 140 by receiving drive force from the rotation of the zoom ring 151 attached on the periphery of the lens barrel 100.

The lens holding member 110 on the left side in FIG. 1 includes a front cylinder 111 and a lens frame 112. The lens frame 112 holds the first lens group 114. The front cylinder 111 has a cam follower 116 on the outside thereof. The cam follower 116 engages with the linear groove section 148 and the cam groove section 152 to move the front cylinder 111 parallel to the optical axis of the optical system 101 according to the rotation of the cam cylinder 150.

The lens holding member 120 positioned in the center of FIG. 1 includes a middle cylinder 121 and a lens frame 122. The lens frame 122 holds the second lens group 124. The middle cylinder 121 holds the lens frame 122, a diaphragm section 162, and a vibration correcting section 164. The lens holding member 120, the second lens group 124, the diaphragm section 162, and the vibration correcting section 164 form the intermediate unit 160.

The middle cylinder 121 includes a V-shaped groove control portion 161 towards the top of FIG. 1 and a U-shaped groove control portion 163 towards the bottom of FIG. 1. The V-shaped groove control portion 161 and the U-shaped groove control portion 163 respectively contact a guide bar 142 and a guide bar 144, thereby setting the position of the middle cylinder 121 with respect to the fixed cylinder 140 in a plane orthogonal to the optical axis of the optical system 101. Furthermore, the middle cylinder 121 includes a cam follower 166 on the outside thereof, and the cam follower 166 engages with the cam groove 154. As a result, the middle cylinder 121 moves relative to the fixed cylinder 140 along the guide bars 142 and 144 in a direction parallel to the optical axis of the optical system 101, according to the rotation of the cam cylinder 150. It should be noted that the middle cylinder 121 is controlled by the guide bars 142 and 144 and therefore does not rotate on the optical axis of the optical system 101.

The lens holding member 130 positioned on the right in FIG. 1 includes a rear cylinder 135 and a lens frame 132. The lens frame 132 holds the third lens group 134. In the same manner as the lens holding member 120, the control portion 131 contacts the guide bars 142 and 144 so that the positions of the rear cylinder 135 and the third lens group 134, which is held by the rear cylinder 135, are set in a plane orthogonal to the optical axis of the optical system 101.

The rear cylinder 135 includes a cam follower 136 on the outside thereof. The cam follower 136 engages with the cam groove section 156. As a result, the rear cylinder 135 is guided by the guide bars 142 and 144 to move relative to the fixed cylinder 140 in a direction parallel to the optical axis of the optical system 101, according to the rotation of the cam cylinder 150. Therefore, the third lens group 134 held by the rear cylinder 135 moves along the guide bars 142 and 144. It should be noted that the rear cylinder 135 is controlled by the guide bars 142 and 144, and therefore does not rotate on the optical axis of the optical system 101.

In the lens barrel 100 described above, the cam cylinder 150 is rotated to press the earn followers 136, 166, etc. with the earn groove sections 152, 154, and 156, thereby moving the front cylinder 111, the middle cylinder 121, and the rear cylinder 135 together. As a result, the focal position, focal distance, and the like of the optical system 101 can be changed.

The lens barrel 100 further includes a barrel-side control unit 171. The barrel-side control unit 171 performs communication control when electric signals are exchanged with a device outside the lens barrel 100, and notifies the external device concerning optical specifications or the like of the lens barrel 100.

Figure 3A:
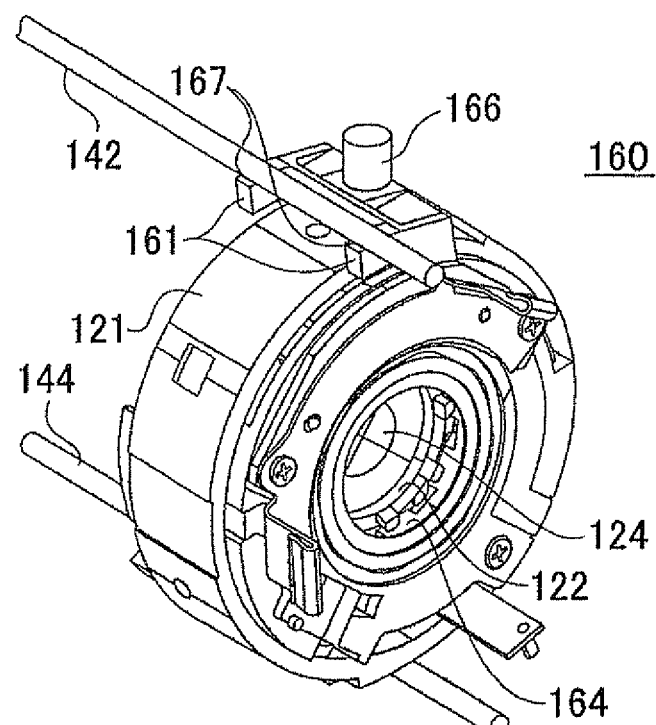
FIG. 3A is a perspective view of the intermediate unit 160 as seen from above and behind the lens barrel 100.
Figure 3B:
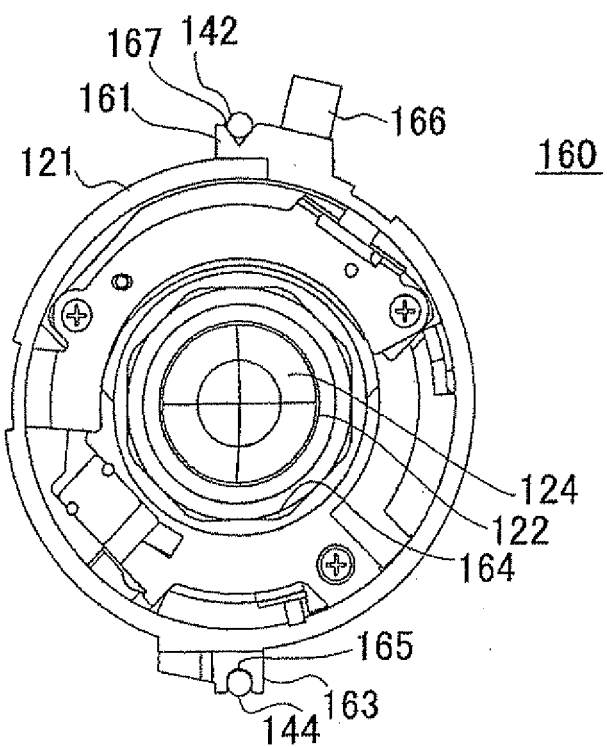
FIG. 3B is a rear view of the intermediate unit 160 as seen from directly behind the lens barrel 100.

FIGS. 3A and 3B are a perspective view and a rear view of the structure of the intermediate unit 160 in the middle cylinder 121. FIG. 3A is a perspective view of the intermediate unit 160 as seen from above and behind the lens barrel 100. FIG. 3B is a rear view of the intermediate unit 160 as seen from directly behind the lens barrel 100.

In the intermediate unit 160, the lens frame 122, the second lens group 124, the diaphragm section 162, and the vibration correcting section 164 are arranged inside the middle cylinder 121. The V-shaped groove control portions 161, the cam follower 166, and the U-shaped groove control portion 163 are arranged on the outer circumferential surface of the middle cylinder 121. The middle cylinder 121, the V-shaped groove control portions 161, the cam follower 166, and the U-shaped groove control portion 163 are preferably formed of a non-magnetic material such as resin.

A V-shaped groove 167 that contacts the guide bar 142 is formed on the top surface of each V-shaped groove control portion 161. In the embodiment of FIG. 3A, a pair of V-shaped groove control portions 161 are formed extending in the direction in which the guide bar 142 extends. As a result, the inclination of the middle cylinder 121 in a plane that includes the guide bar 142 and the optical axis of the optical system 101 can be controlled, thereby controlling the inclination of the second lens group 124 relative to the optical axis of the optical system 101.

The cam follower 166 is arranged adjacent to the V-shaped groove control portions 161 on the outer circumferential surface of the middle cylinder 121. The cam follower 166 protrudes radially outward from the outer circumferential surface of the middle cylinder 121.

The U-shaped groove control portion 163 includes a U-shaped groove 165 that engages with the guide bar 144. Specifically, the U-shaped groove 165 has a pair of contact surfaces that are parallel to each other and have a space therebetween that is greater than the diameter of the guide bar 144. The U-shaped groove 165 sandwiches the guide bar 144 from directions tangential to the position where the U-shaped groove control portion 163 of the middle cylinder 121 is arranged.

The V-shaped groove 167 and the U-shaped groove 165 respectively contact the guide bars 142 and 144 to set the position of the middle cylinder 121 in a plane orthogonal to the optical axis of the optical system 101. Furthermore, the rotation of the middle cylinder 121 on the guide bar 142 in a plane orthogonal to the optical axis of the optical system 101 can be restricted.

The following describes the magnetic configuration around the V-shaped groove control portion 161. The magnetic configuration around the V-shaped groove control portion 161 can also be applied for the U-shaped groove control portion 163.

Figure 4:
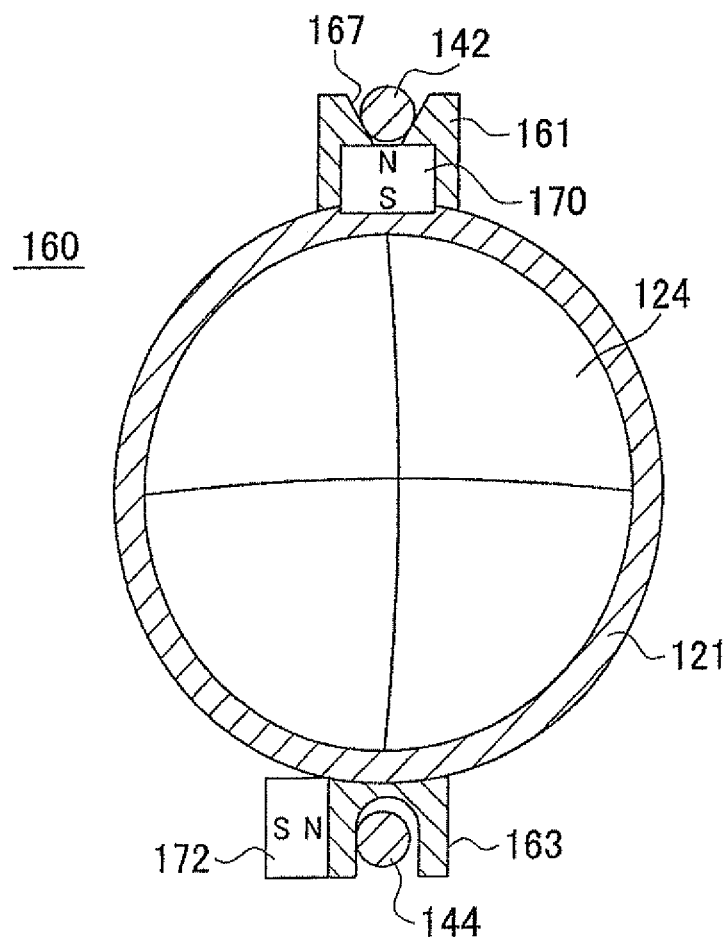
FIG. 4 is a schematic view showing the magnetic configuration of the intermediate unit 160.

FIG. 4 is a schematic view showing the magnetic configuration of the intermediate unit 160. In the intermediate unit 160, the V-shaped groove control portion 161 and the U-shaped groove control portion 163 are arranged outside the middle cylinder 121 at positions substantially symmetrical to the optical axis. The intermediate unit 160 includes permanent magnets 170 and 172 that are arranged respectively in the V-shaped groove control portion 161 and the U-shaped groove control portion 163.

The permanent magnet 170 is arranged in the V-shaped groove control portion 161 in the region where the surfaces of the V-shaped groove 167 draw nearer, and is magnetized to have poles divided in the radial direction of the middle cylinder 121, which includes a cross-sectional plane of the guide bar 142. The material for the permanent magnet 170 is not particularly limited, and a magnetized metal such as neodymium metal may be used. The guide bar 142 is formed of a magnetic material. Accordingly, the permanent magnet 170 exerts magnetic attraction on the guide bar 142, and so the guide bar 142 is pressed against the V-shaped groove 167.

The guide bar 142 contacts the V-shaped groove 167 at two points, and therefore a gap is prevented from being formed between guide bar 142 and the V-shaped groove 167. The second lens group 124 held within the middle cylinder 121 has a smaller diameter than the other lens groups and therefore has a low weight, enabling the lens frame 122 to be reliably held using magnetic attraction.

The permanent magnet 172 is arranged on one of the surfaces of the U-shaped groove 165 of the U-shaped groove control portion 163, and is magnetized to divide the poles in a direction orthogonal to the radial direction of the middle cylinder 121, which includes a cross section of the guide bar 144. The guide bar 144 is formed of a magnetic material. Accordingly, the permanent magnet 172 exerts magnetic attraction on the guide bar 144 such that the guide bar 144 is pressed against one surface of the U-shaped groove 165. As a result, the position of the U-shaped groove 165 is set in a plane orthogonal to the optical axis of the optical system 101.

With the embodiment shown in FIG. 4, the guide bar 142 and the V-shaped groove control portion 161 are drawn together by magnetism and the guide bar 144 and the U-shaped groove control portion 163 are also drawn together by magnetism, and therefore, when the second lens group 124 is not moving in the direction of the optical axis, the gap between the middle cylinder 121 and the guide bars 142 and 144 is eliminated and the middle cylinder 121 can be set at a desired position in the plane orthogonal to the optical axis of the optical system 101. The poles of the permanent magnet 170 and permanent magnet 172 are shown in FIG. 4 to indicate the direction of the magnetic attraction generated by the permanent magnets 170 and 172, but the polarity arrangement of the permanent magnets 170 and 172 is not limited to this.

As described above, the guide bars 142 and 144 slide in the V-shaped groove 167 and the U-shaped groove 165. Accordingly, the surfaces of the V-shaped groove 167 and the U-shaped groove 165 that the guide bars 142 and 144 contact are preferably covered with a low-friction material. Furthermore, the V-shaped groove control portion 161 or the U-shaped groove control portion 163 itself may be formed of a low-friction material. As a result, the movement of the intermediate unit 160 can be achieved more smoothly.

Figure 5:
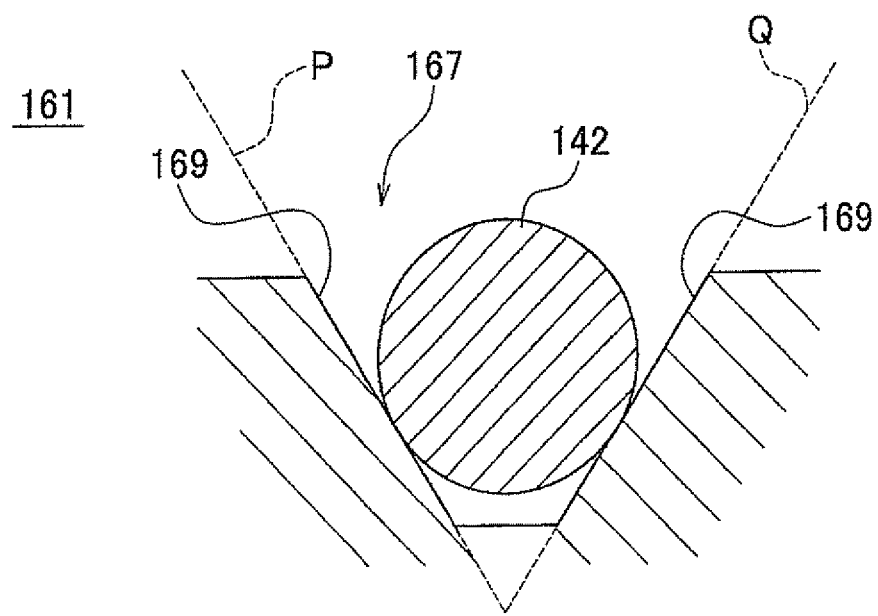
FIG. 5 is an enlarged view of the V-shaped groove control portion 161.

FIG. 5 is an enlarged view of the V-shaped groove 167 of the V-shaped groove control portion 161. As shown in FIG. 5, the V-shaped groove 167 has a pair of contact surfaces 169 that contact the outer circumferential surface of the guide bar 142 and are respectively positioned in planes P and Q that intersect at an angle to form a V shape. In this case, the cross section of the V-shaped groove 167 need not form a perfect V shape if the contact surfaces 169 are formed. As a result, the height of the V-shaped groove control portion 161 is restricted in the radial direction of the middle cylinder 121, thereby decreasing the diameter of the lens barrel 100.

Figure 6:
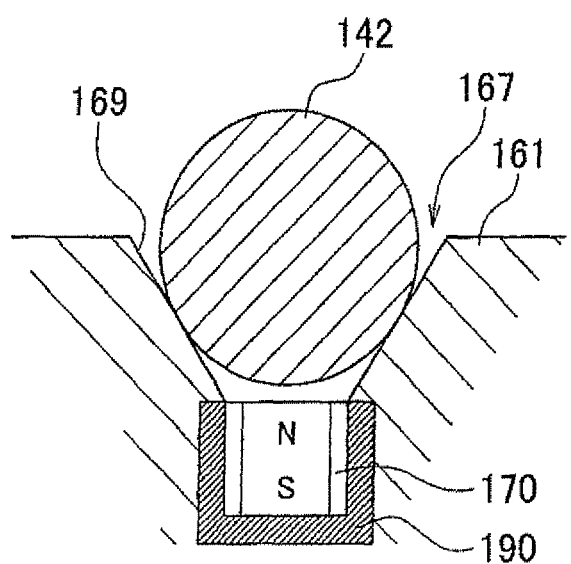
FIG. 6 is a schematic view showing another example of the magnetic configuration near the V-shaped groove control portion 161.

FIG. 6 is a schematic view showing another example of the magnetic configuration near the V-shaped groove control portion 161. This V-shaped groove control portion 161 has the permanent magnet 170 arranged at the bottom of the V-shaped groove 167, in the same manner as the structure described in FIG. 4.

This V-shaped groove control portion 161 includes a yoke 190 that covers a portion of the surface of the permanent magnet 170. The yoke 190 is formed by a plate-shaped magnetic body using a ferrous metal material, for example. The yoke 190 contacts the magnetic pole (shown as the S pole in this example) that is further from the guide bar 142 formed of a magnetic material and extends to a region near the magnetic pole (shown as the N pole in this example) that is closer to the guide bar 142. The end of the magnetic pole (shown as the N pole in this example) that faces the guide bar 142 is left uncovered.

As a result, the flux generated by the permanent magnet 170 forms a magnetic field in the small region surrounded by the N pole surface of the permanent magnet 170, the two ends of the yoke 190, and the guide bar 142. Accordingly, the magnetic force of the permanent magnet 170 can be used efficiently to attract the guide bar 142. Furthermore, flux leakage can be eliminated by covering the surface of the permanent magnet 170 on the middle cylinder side with a yoke to close the magnetic circuit, thereby restricting the effect of the magnetism from the permanent magnet 170 on the motor, the sensor, and the like of the vibration correcting section 164.

Figure 7:
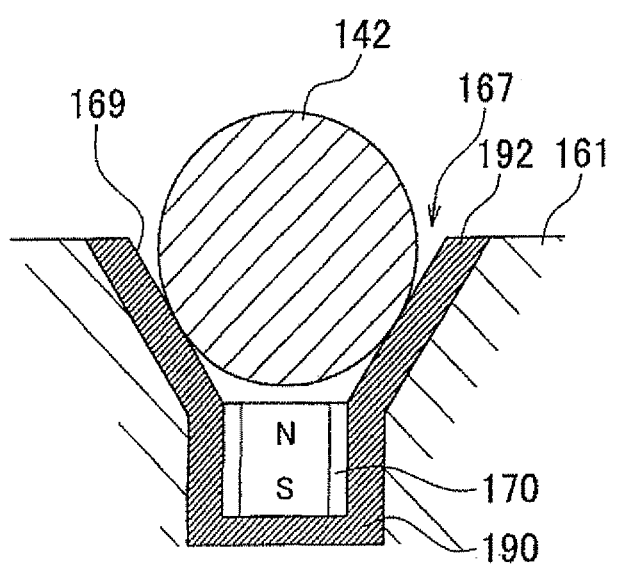
FIG. 7 is a schematic view showing another example of the magnetic configuration near the V-shaped groove control portion 161.

FIG. 7 is a schematic view showing another example of the magnetic configuration near the V-shaped groove control portion 161. This V-shaped groove control portion 161 includes the permanent magnet 170 at the bottom of the V-shaped groove 167 and the yoke 190 is formed around the permanent magnet 170, in the same manner as the structure shown in FIG. 5.

In this V-shaped groove control portion 161, the ends of the yoke 190 extend upward to form yoke extensions 192. As a result, the magnetic circuit formed by the permanent magnet 170, the yoke 190, and the yoke extensions 192 can be closer to the guide bar 142. Accordingly, the magnetic force generated by the permanent magnet 170 can be used more efficiently on the guide bar 142.

Figure 8:
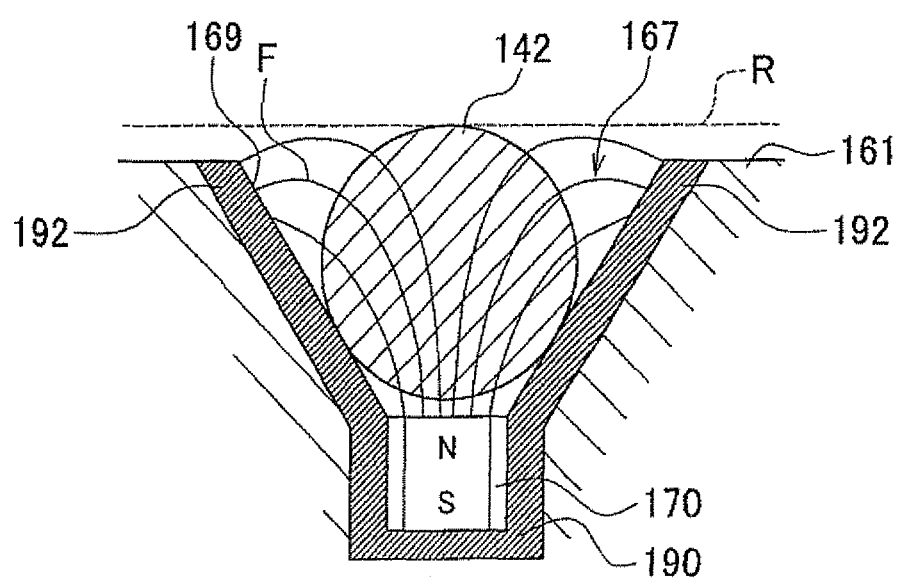
FIG. 8 is a schematic view showing another example of the magnetic configuration near the V-shaped groove control portion 161.

FIG. 8 is a schematic view showing another example of the magnetic configuration near the V-shaped groove control portion 161. This V-shaped groove control portion 161 includes the permanent magnet 170 at the bottom of the V-shaped groove 167, the yoke 190 is formed around the permanent magnet 170, and the ends of the yoke 190 have the yoke extensions 192 that form the contact surfaces 169 of the V-shaped groove 167, in the same manner as the structure shown in FIG. 7.

With this V-shaped groove control portion 161, the V-shaped groove 167 formed by the yoke extensions 192 serving as the contact surfaces 169 is made deeper. It should be noted that the top ends of the V-shaped groove 167 are positioned lower, i.e. closer to the optical axis of the optical system 101, than the top of the cross section of the guide bar 142 (shown by the dotted line R in FIG. 8), i.e. an edge of the outside of the middle cylinder 121. As a result, the entire cross section of the guide bar 142 is within the magnetic field generated by the permanent magnet 170, thereby stabilizing the magnetic force acting on the guide bar 142. In FIG. 8, the magnetic force lines are indicated by the "F" lines.

Figure 9:
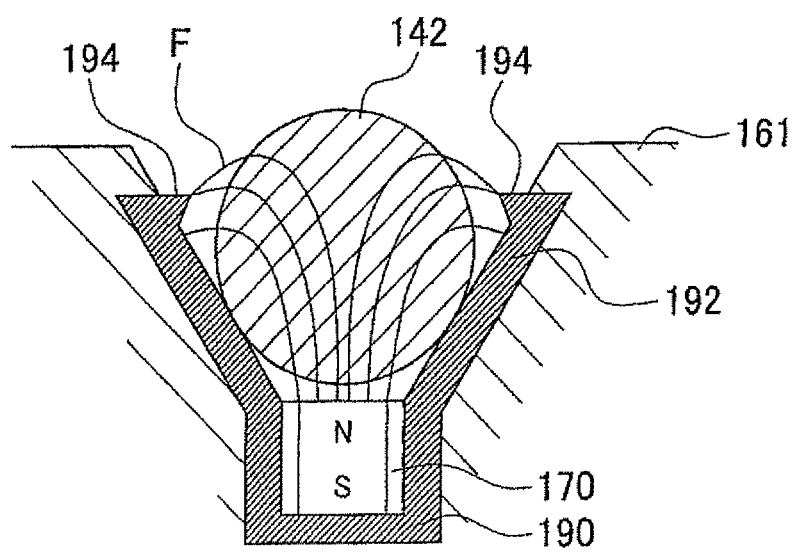
FIG. 9 is a schematic view showing another example of the magnetic configuration near the V-shaped groove control portion 161.

FIG. 9 is a schematic view showing another example of the magnetic configuration near the V-shaped groove control portion 161. This V-shaped groove control portion 161 includes the permanent magnet 170 at the bottom of the V-shaped groove 167, the yoke 190 is formed around the permanent magnet 170, and the ends of the yoke 190 have the yoke extensions 192 that form the contact surfaces 169 of the V-shaped groove 167, in the same manner as the structure shown in FIG. 8. In FIG. 9, the magnetic force lines are indicated by the "F" lines.

In this V-shaped groove control portion 161, convex portions 194 protruding toward the guide bar 142 are formed at the ends of the yoke extensions 192. As a result, the flux generated by the permanent magnet 170 can be induced to pass through the cross-section of the guide bar 142, particularly the center of the cross section, and focus at the convex portions 194. Accordingly, the magnetic force generated by the permanent magnet 170 is used efficiently on the guide bar 142. In consideration of the effect described above, the convex portion 194 is preferably formed of a magnet or magnetic material.

Figure 10:
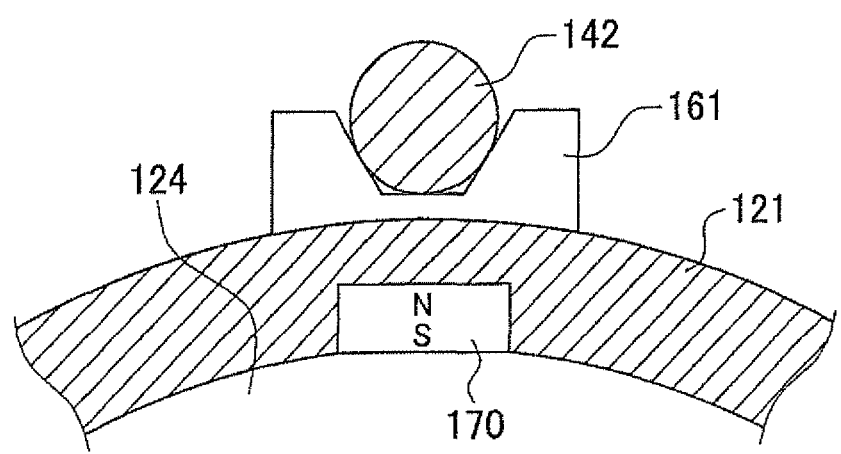
FIG. 10 is a schematic view showing another example of the magnetic configuration near the V-shaped groove control portion 161.

FIG. 10 is a schematic view showing another example of the magnetic configuration near the V-shaped groove control portion 161. This V-shaped groove control portion 161 includes the guide bar 142 formed of a magnetic material and the permanent magnet 170 arranged on the V-shaped groove control portion 161, in the same manner as the structure shown in FIG. 4.

Here, the permanent magnet 170 is buried in the middle cylinder 121 instead of in the V-shaped groove control portion 161. In other words, the intermediate unit 160 includes the middle cylinder 121, which is arranged on the outer circumferential surface of the second lens group 124, and a portion of the middle cylinder 121 is arranged between the permanent magnet 170 and the contact surfaces 169 of the V-shaped groove control portion 161. With this configuration, the height of the V-shaped groove control portion 161 in the radial direction of the middle cylinder 121 can be restricted to decrease the diameter of the lens barrel 100. Furthermore, the friction between the guide bar 142 and the V-shaped groove control portion 161, particularly static friction, can be decreased.

Figure 11:
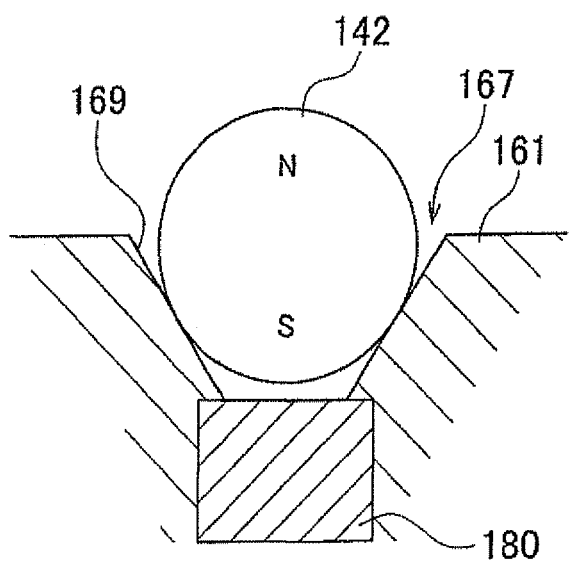
FIG. 11 is a schematic view showing another example of the magnetic configuration near the V-shaped groove control portion 161.

FIG. 11 is a schematic view showing another example of the magnetic configuration near the V-shaped groove control portion 161. This V-shaped groove control portion 161 includes a magnetic block 180 buried below the bottom of the V-shaped groove 167. The guide bar 142 is formed by a permanent magnet. In this embodiment, the guide bar 142 is magnetized such that the poles are divided along the diameter thereof. As a result, the N pole and S pole appear in the guide bar 142 in a cross-sectional plane orthogonal to the optical axis of the optical system 101.

With this configuration, the same effect as the V-shaped groove control portion 161 of the intermediate unit 160 shown in FIG. 4 can be achieved. In other words, since the magnetic block 180 is attracted using the magnetic force generated by the guide bar 142, the outer circumferential surface of the guide bar 142 is pressed against the contact surfaces 169 of the V-shaped groove 167. As a result, a gap can be prevented from being formed between the guide bar 142 and the V-shaped groove 167. In the embodiment described above, the magnetic block 180 has a rectangular cross section. However, the magnetic block 180 may instead be formed in a manner to extend as the contact surfaces of the V-shaped groove 167, as shown by the yoke 190 in FIGS. 7 to 9.

Figure 12:
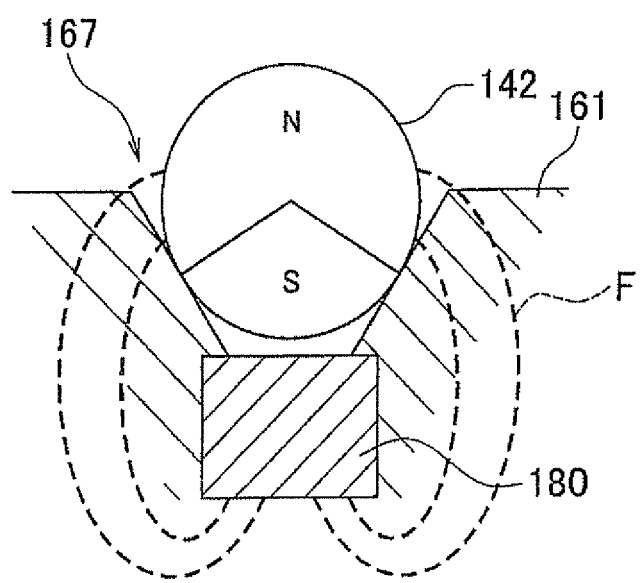
FIG. 12 is a schematic view showing another example of the magnetic configuration near the V-shaped groove control portion 161.

FIG. 12 is a schematic view showing another example of the magnetic configuration near the V-shaped groove control portion 161. This V-shaped groove control portion 161 includes the magnetic block 180 and the guide bar 142 is magnetized such that the poles are divided along the diameter thereof, in the same manner as the structure described in FIG. 2. This V-shaped groove control portion 161 also has both the N pole and the S pole appear in the guide bar 142 in a cross section orthogonal to the optical axis of the optical system 101.

Here, on the surface of the guide bar 142, the magnetic pole (the N pole in this example) further from the optical axis of the optical system 101 occupies a large circumference, and the magnetic pole (the S pole in this example) closer to the optical axis occupies a relatively small circumference. Therefore, in the cross section orthogonal to the optical axis, each magnetic pole is shaped as a sector that is not a half-circle, and the sector formed by the magnetic pole closer to the magnetic block 180 has an internal angle that is less than 180 degrees, preferably an internal angle of approximately 120 degrees.

With the unique magnetic configuration described above, the magnetic field generated by the guide bar 142, which is a permanent magnet, is formed with a bias to be closer to the V-shaped groove control portion 161, as shown by the magnetic force lines F in FIG. 12. Accordingly, the magnetic force generated by the guide bar 142 can be applied efficiently to the magnetic block 180 buried in the V-shaped groove control portion 161.

FIG. 13 is a schematic view showing another example of the magnetic configuration near the V-shaped groove control portion 161. This V-shaped groove control portion 161 includes the magnetic block 180 buried at the bottom of the V-shaped groove 167 and the guide bar 142 formed by a permanent magnet, in the same manner as the structure shown in FIG. 11.

In the present embodiment, the guide bar 142 includes a yoke 190 that covers a portion of the surface thereof. The yoke 190 is formed by a magnetic material, contacts the magnetic pole (the N pole in this example) that is further from the magnetic block 180, and extends to a region near the magnetic pole (the S pole in this example) closer to the magnetic block 180. The yoke 190 does not cover the surface facing the magnetic block 180, which is a portion of the S pole surface in this example.

As a result, the flux generated by the guide bar 142 forms a magnetic field in the small region surrounded by the S pole surface of the guide bar 142, the ends of the yoke 190, and the magnetic block 180. Accordingly, the magnetic force can be used efficiently to attract the magnetic block 180.

Figure 14:
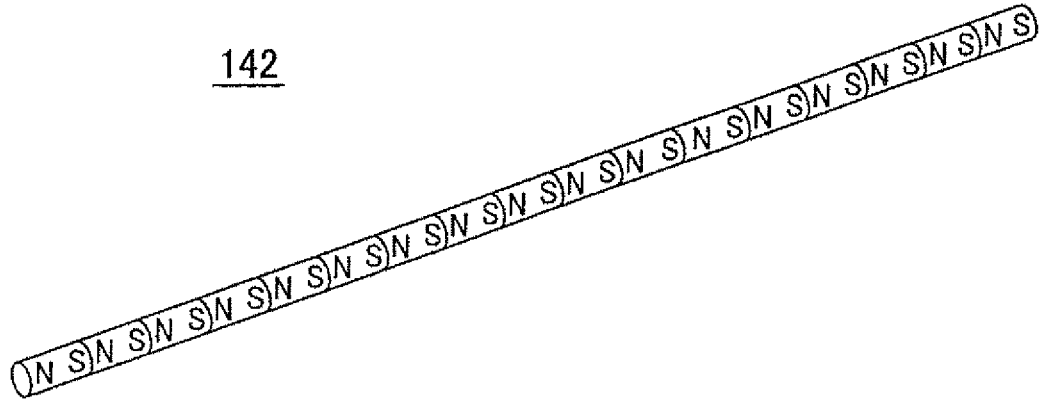
FIG. 14 is a schematic view showing an example of a magnetic configuration of the guide bar 142.

FIG. 14 is a schematic view showing an example of a magnetic configuration of the guide bar 142. In the present embodiment, the guide bar 142 is magnetized such that the magnetic poles are divided in the longitudinal direction. Even when the direction for dividing the magnetic poles is changed in this way, attraction can be exerted on the magnetic block 180 buried in the V-shaped groove control portion 161 in the same manner as in the embodiments described above.

It should be noted that if the guide bar 142 is magnetized by being divided into two equal portions causing a pair of magnetic poles to appear, the attractive force exerted on the magnetic block 180 will change according to the longitudinal position on the guide bar 142. Therefore, as shown in FIG. 14, the guide bar 142 is preferably magnetized to form a magnetic pattern in which a pair of poles repeat in the direction of the optical axis.

In this way, the lens barrel 100 can be formed to include the intermediate unit 160 having the lens holding member 120 that holds the lens, the guide bar 142 that is arranged in a direction of the optical axis of the optical system 101, and the V-shaped groove control portion 161 that controls the position of the intermediate unit 160 relative to the guide bar 142, wherein one of the V-shaped groove control portion 161 and the guide bar 142 includes a permanent magnet 170 having at least a portion thereof covered by a yoke 190 made of a magnetic material and the other of the V-shaped groove control portion 161 and the guide bar 142 includes a magnetic material.

Figure 15:
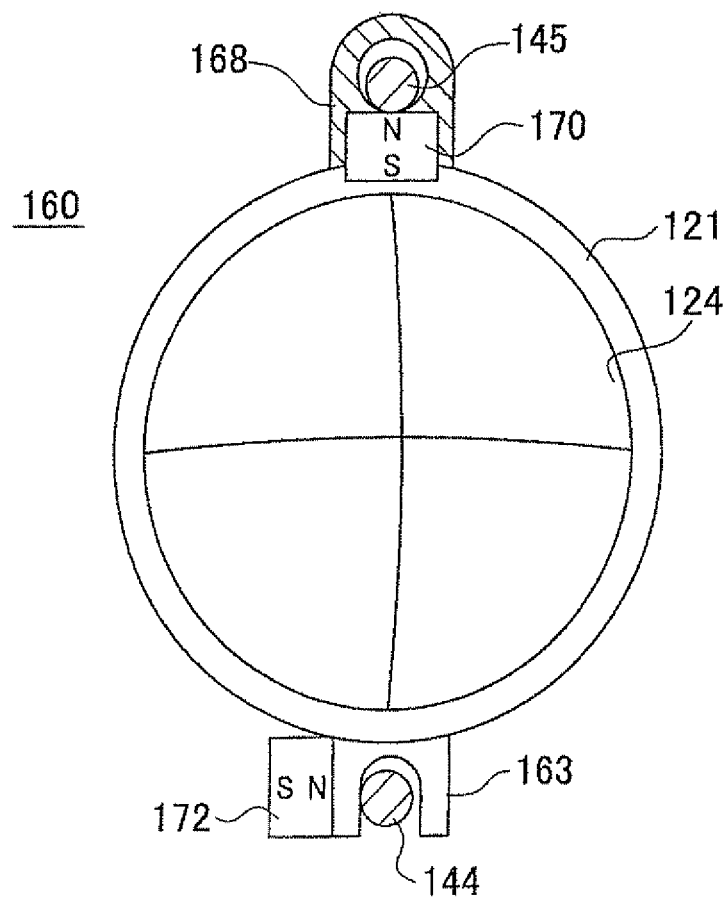
FIG. 15 is a schematic view showing a magnetic configuration near the cylindrical control portion 168.

FIG. 15 is a schematic view showing a structure of the intermediate unit 160 according to another embodiment. The intermediate unit 160 includes a cylindrical control portion 168 and a U-shaped groove control portion 163, which are arranged substantially symmetrically outside the middle cylinder 121, and permanent magnets 170 and 172 provided respectively for the cylindrical control portion 168 and the U-shaped groove control portion 163.

The cylindrical control portion 168 has a cylindrical portion that is parallel with the optical axis of the optical system 101, and cylinder guide bar 145 formed of a magnetic material is inserted therein. The permanent magnet 170 is magnetized such that the magnetic poles are divided in a radial direction of the middle cylinder 121 including a cross section of the cylinder guide bar 145.

Accordingly, since the permanent magnet 170 uses magnetic force to attract the cylinder guide bar 145, the cylinder guide bar 145 is pressed against the cylindrical control portion 168. As a result, a gap is prevented from being formed between the cylinder guide bar 145 and the cylindrical control portion 168. The structure of the U-shaped groove control portion 163 is the same as described in FIG. 4, and therefore no further description is provided.

The above embodiments described examples in which a combination of permanent magnets 170 and 172 and guide bars 142 and 144 formed of magnetic material or a combination of a magnetic block 180 and a guide bar 142 formed of a permanent magnet were used. However, a lens barrel 100 achieving the same effect can be formed even if both components in a combination are permanent magnets.

In particular, if both components in a combination are permanent magnets, the effect of the change in magnetic force can be decreased, which is preferable. In this case, in order to reduce friction, a low-friction material is preferably used for the guide bars or the contact surfaces.

When using permanent magnets, changes in the magnetic fields can be restricted, which is preferable, by moving the permanent magnets in the direction of the optical axis along with the held lens groups. The distance between a permanent magnet and the magnetic body (or other permanent magnet) being combined therewith is preferably adjusted according to the shape, magnetic strength, or magnetic permeability of the permanent magnet and the magnetic body, the weight of the lens groups, or the like.

Figure 16:
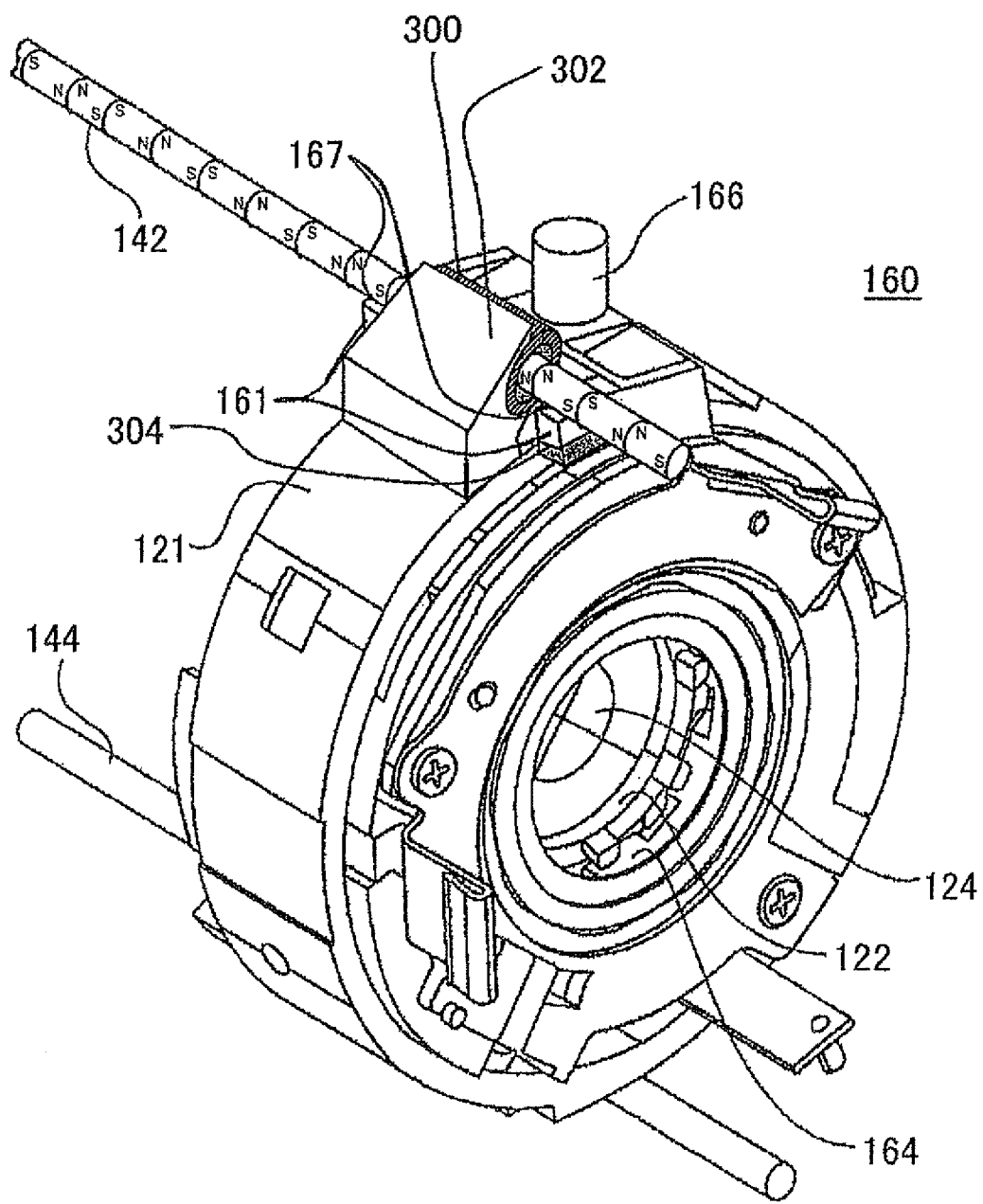
FIG. 16 is a perspective view showing another structure of the intermediate unit 160.
Figure 17:
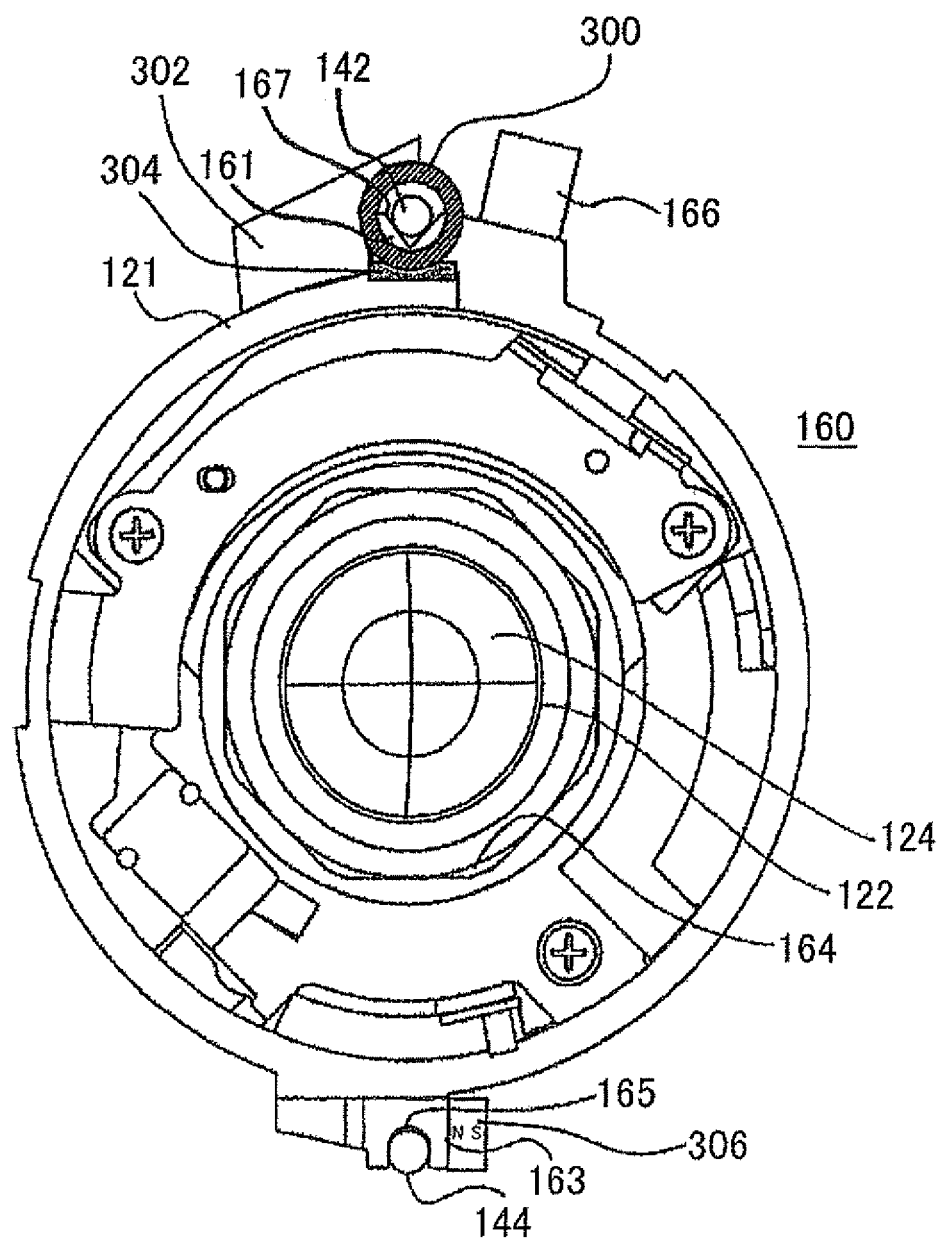
FIG. 17 is a rear view of the intermediate unit 160 shown in FIG. 16.

FIG. 16 is a perspective view showing another structure of the intermediate unit 160. FIG. 17 is a rear view of the intermediate unit 160 shown in FIG. 16. In the intermediate unit 160 of FIGS. 16 and 17, aside from the guide bars 142 and 144 and the mechanism for holding these guide bars being different, this intermediate unit 160 has the same configuration as the intermediate unit 160 described in FIG. 3, and therefore descriptions of identical structures are omitted.

The guide bar 142 in FIGS. 16 and 17 has a magnetic pattern in which a pair of magnetic poles repeat in the longitudinal direction. The V-shaped groove control portion 161 includes a magnetic body 304 that generates magnetic force between itself and the magnetic pattern of the guide bar 142. The magnetic force between the magnetic body 304 and the magnetic pattern of the guide bar 142 causes the V-shaped groove 167 to contact the guide bar 142, thereby restricting the inclination of the middle cylinder 121 that appears in the plane including the guide bar 142 and the optical axis of the optical system.

A drive coil support jig 302, which may be made of resin, is affixed to the outer circumferential surface of the middle cylinder 121. The drive coil support jig 302 has a cylindrical drive coil 300 affixed thereto. The drive coil 300 is arranged in a manner to not contact the guide bar 142, and generates a magnetic drive force between itself and the guide bar 142. The drive coil 300 can be applied for single-phase or multi-phase drive types. By causing current to flow from the outside through the drive coil 300, thrust force in the axial direction of the guide bar 142 is generated between the drive coil 300 and the guide bar 142. The guide bar 142 is fixed to the fixed cylinder 140, and therefore this thrust force causes the V-shaped groove 167 to slide relative to the guide bar 142, such that the intermediate unit 160 moves in the longitudinal direction of the guide bar 142. The guide bar 142 in FIGS. 16 and 17 has a magnetic pattern, and therefore a single guide bar 142 can be used for both a drive farce supplying member, which supplies linear drive force to the intermediate unit 160, and a guiding member, which guides the movement of the intermediate unit 160.

The guide bar 144 is formed of a magnetic material. A permanent magnet 306 is arranged on the U-shaped groove control portion 163 contacting the guide bar 144. The structures of these components are the same as those of the guide bar 144, the U-shaped groove control portion 163, and the permanent magnet 172 of FIG. 4.

A magnetic stripe is applied to the guide bar 144 made of the magnetic material, and position or movement amount of the middle cylinder 121 can be detected by providing a magnetic encoder on the middle cylinder 121 side. Instead, the position or movement amount of the middle cylinder 121 may be detected by detecting the magnetic pattern of the guide bar 142 using a Hall element provided on the middle cylinder 121 side.

Figure 19:
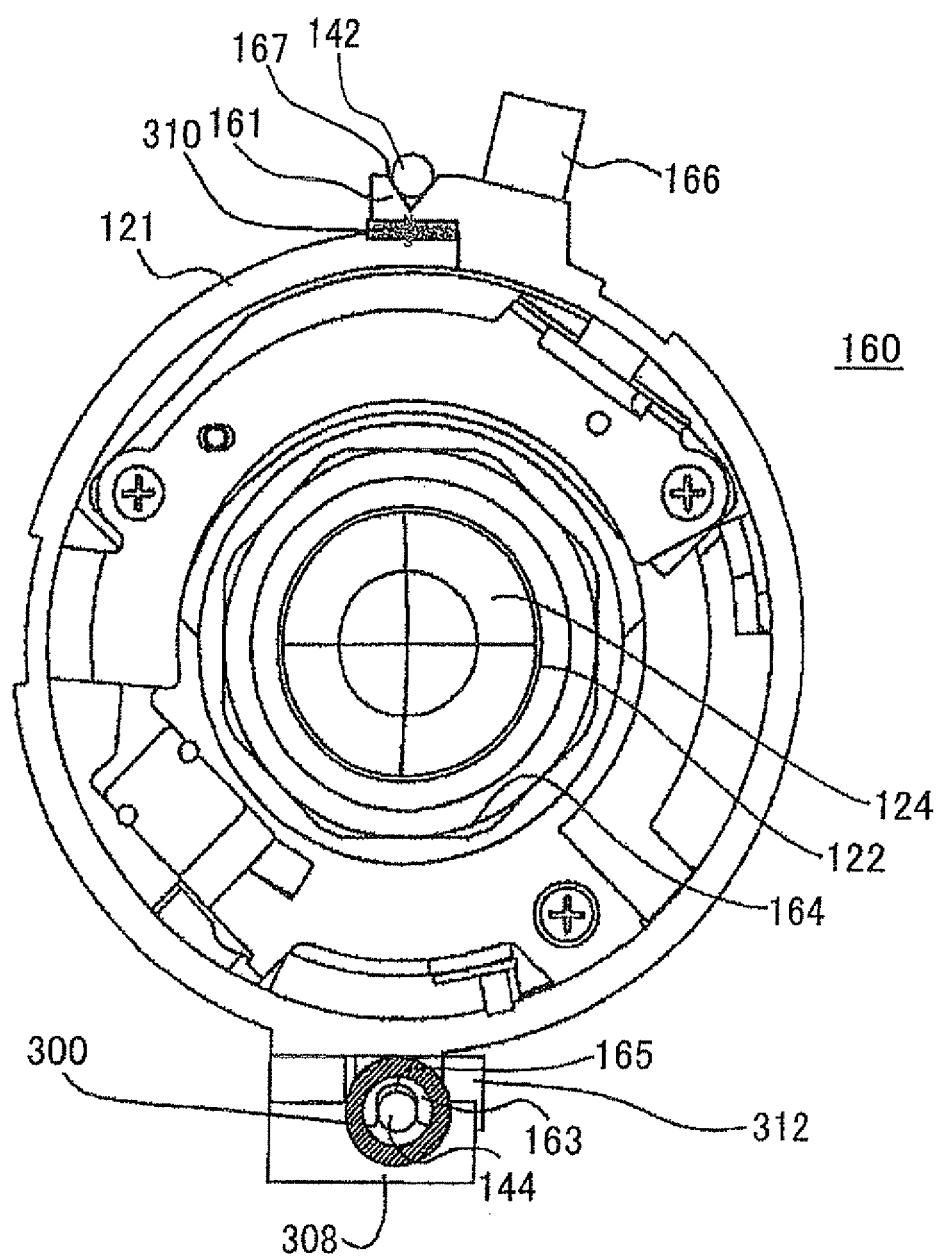
FIG. 19 is a rear view of the intermediate unit 160 shown in FIG. 18.

FIG. 18 is a perspective view showing another structure of the intermediate unit 160. FIG. 19 is a rear view of the intermediate unit 160 shown in FIG. 18. In the intermediate unit 160 of FIGS. 18 and 19, aside from the guide bars 142 and 144 and the mechanism for holding these guide bars being different, this intermediate unit 160 has the same configuration as the intermediate unit 160 described in FIG. 3, and therefore descriptions of identical structures are omitted.

In FIG. 18, the guide bar 142 is formed of a magnetic material. A permanent magnet 310 is arranged on the V-shaped groove control portion 161 that contacts the guide bar 142. The structures of these components are the same as those of the guide bar 142, the V-shaped groove control portion 161, and the permanent magnet 170 of FIG. 4.

The guide bar 144 in FIGS. 18 and 19 has a magnetic pattern in which a pair of magnetic poles repeat in the longitudinal direction. The U-shaped groove control portion 163 includes a magnetic body 312 that generates magnetic force between itself and the magnetic pattern of the guide bar 144. The magnetic force generated between the magnetic body 312 and the magnetic pattern of the guide bar 144 causes the U-shaped groove 165 to contact the guide bar 144, thereby restricting the rotation of the middle cylinder 121 in the plane orthogonal to the optical axis of the optical system 101.

A drive coil support jig 308 is mounted on a different lens holding member 130 than the middle cylinder 121, and this lens holding member 130 is not shown in FIGS. 18 and 19. A cylindrical drive coil 300 is mounted on the drive coil support jig 308. The drive coil 300 is arranged in a manner to not contact the guide bar 142, and generates a magnetic drive force between itself and the guide bar 142. The drive coil 300 can be applied for single-phase or multi-phase drive types. By causing current to flow from the outside through the drive coil 300, thrust force in the axial direction of the guide bar 142 is generated between the drive coil 300 and the guide bar 142. The guide bar 142 is fixed to the fixed cylinder 140, and therefore this thrust force causes the lens holding member 130 to move in the longitudinal direction of the guide bar 142.

The middle cylinder 121 in FIGS. 18 and 19 moves in the longitudinal direction of the guide bar 142 in response to the cam follower 166 being driven by the cam cylinder 150. This guide bar 142, which restricts the inclination of the middle cylinder 121 appearing in a plane that includes the optical axis of the optical system and the guide bar 142, need not be a magnet and may instead be formed of a magnetic material, and therefore a variety of materials can be selected and the linearity during construction can be increased, thereby restricting skewing of the optical axis when the middle cylinder 121 moves.

As modifications of the embodiments according to FIGS. 16 to 19, the drive coil 300 may be arranged on the V-shaped groove control portion 161 side or the U-shaped groove control portion 163 side of the intermediate unit 160, magnetic patterns may be provided for both of the guide bars 142 and 144, and a drive coil 300 may be provided for both of the guide bars 142 and 144. Furthermore, a drive coil 300 may be arranged on the middle cylinder 121, on the lens holding member 130 or the like, or on both. Yet further, the guide bars 142 and 144 may be fixed to the fixed cylinder 140 in the longitudinal direction and a drive coil 300 fixed to the middle cylinder 121 or the like may move along the guide bars 142 and 144, or a drive coil 300 may be fixed to the fixed cylinder 140 and the guide bars 142 and 144 fixed to the middle cylinder 121 or the like may move relative to this drive coil 300.

Figure 20:
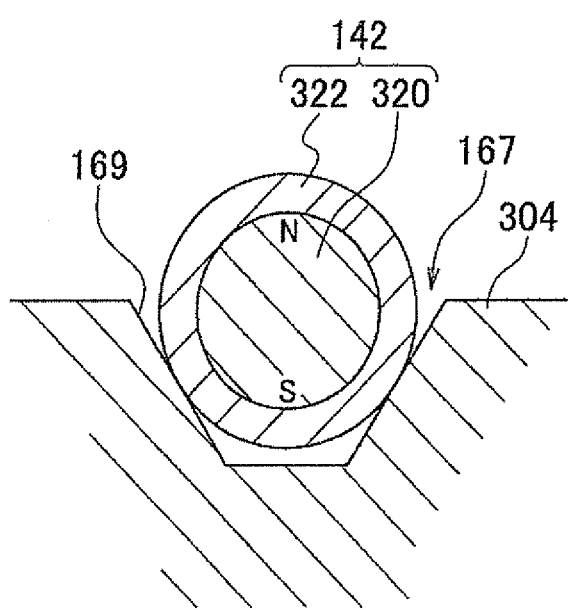
FIG. 20 is a cross-sectional view of another magnetic configuration of the guide bar 142.

FIG. 20 is a cross-sectional view of another magnetic configuration of the guide bar 142. The guide bar 142 of FIG. 20 includes a permanent magnet 320 arranged in the center thereof and a non-magnetic coating portion 322 that covers the outer circumferential surface of the permanent magnet 320. A low-friction material is used for the coating portion 322. The permanent magnet 320 and the magnetic body 304 are attracted to each other by magnetic force, thereby causing the coating portion 322 to contact the contact surfaces 169. As a result, the sliding resistance can be decreased while maintaining reliable contact between the coating portion 322 and the contact surfaces 169.

In the guide bar of FIG. 20, permanent magnets 320 may be arranged uniformly in the longitudinal direction, or may be provided at portions facing magnetic bodies 304 within the movable range of the middle cylinder 121. The coating portion 322 may cover the permanent magnets 320 uniformly in the longitudinal direction, or may be provided at portions between the permanent magnets 320 and the magnetic bodies 304 within the movable range of the middle cylinder 121.

FIG. 21 is a schematic view of an image capturing device 400 provided with the lens barrel 100. In order to prevent FIG. 21 from being overly complex, the lens barrel 100 is shown schematically. However, the lens barrel 100 shown in FIG. 21 has the same configuration as the lens barrel 100 described in FIG. 1. Therefore, components that are the same as those in FIG. 1 are given the same reference numerals and redundant explanation is omitted.

The lens barrel 100 is detachably mounted on a mount section 260 of the image capturing unit 200. In the image capturing device 400, the lens barrel 100 is electrically connected to the image capturing unit 200 via connection terminals of a base 143. In this way, the lens barrel 100 receives power from the image capturing unit 200. Furthermore, information is exchanged between a barrel-side control unit 171 of the lens barrel 100 and a main control section 250 of the image capturing unit 200.

The image capturing unit 200 houses a main control section 250 and an optical system that includes a main mirror 240, a pentaprism 270, and an ocular optical system 290. The main mirror 240 moves between a standby position, in which the main mirror 240 is oriented diagonally in the optical path of incident light through the optical system 101 of the lens barrel 100, and an image capture position, which is shown by the dotted line in FIG. 21 and in which the main mirror 240 is raised out of the optical path of the incident light.

When in the standby position, the main mirror 240 guides a majority of the incident light to a focusing screen 272 arranged thereabove. The focusing screen 272 is arranged at a focal position of the optical system 101 of the lens barrel 100 to create an image formed by the optical system 101.

The image created by the focusing screen 272 can be seen from the ocular optical system 290 via the pentaprism 270. Therefore, the image on the focusing screen 272 can be seen as a normal image from the ocular optical system 290.

A half mirror 292 is arranged between the pentaprism 270 and the ocular optical system 290, and this half mirror 292 superimposes the display image formed by the finder LCD 294 onto the image of the focusing screen 272. As a result, the image seen at the output end of the ocular optical system 290 is a combination of the image of the focusing screen 272 and the image of the finder LCD 294. The finder LCD 294 displays information concerning image capturing conditions, setting conditions, and the like of the image capturing device 400.

A portion of the light output from the pentaprism 270 is guided to the photometric unit 280. The photometric unit 280 measures the intensity of the light and a distribution or the like thereof, and these measurement results are referenced when determining the image capturing conditions.

The back surface of the main mirror 240, which is opposite the incident surface that receives the incident light, has a secondary mirror 242. The secondary mirror 242 guides a portion of the incident light passing through the main mirror 240 to a focal point detecting unit 230 positioned therebelow. Therefore, when the main mirror 240 is in the standby position, the focal point detecting unit 230 detects a focal point position that is suitable for the subject. When the main mirror 240 moves to the image capture position, the secondary mirror 242 also moves out of the optical path of the incident light.

A shutter 220, an optical filter 212, and an image capturing element 210 are arranged on the optical axis behind the main mirror 240 relative to a direction of the incident light from the lens barrel 100. When the shutter 220 is open, the main mirror 240 moves to the image capture position immediately therebefore, and so the incident light progresses to be incident to the image capturing element 210. As a result, the image formed by the incident light is converted into an electric signal by the image capturing element 210.

The image capturing unit 200 is provided with a main LCD 296 facing outward on a back surface of the lens barrel 100. The main LCD 296 displays various types of setting information concerning the image capturing unit 200, and also displays the image formed by the image capturing element 210 when the main mirror 240 is in the image capture position.

The main control section 250 performs overall control of the various operations described above. Furthermore, an auto-focus mechanism can be formed that drives the lens barrel 100 while referencing information concerning the distance to a subject as detected by the focal point detecting unit 230 of the image capturing unit 200. As another example, an auto-focus mechanism can be formed by the focal point detecting unit 230 referencing the movement amount of the lens barrel 100.

The main control section 250 also controls the opening and closing of a diaphragm section 162 by exchanging information with the barrel-side control unit 171 of the lens barrel 100. The main control section 250 also provides automatic exposure, scene mode execution, bracket image capturing, or the like.

In this way, the image capturing device 400 can be formed to include the lens barrel 100 and the image capturing unit 200 that captures images formed by the optical system 101 containing the first lens group 114, the second lens group 124, and the third lens group 134. The lens barrel 100 can be suitably used in the image capturing device 400 in this way. However, the use of the lens barrel 100 is not limited to this. For example, the lens barrel 100 and the image capturing unit 200 may be formed integrally in the image capturing device. As another example, the lens barrel 100 can be used for a focusing mechanism, a zoom mechanism, or the like in an optical system such as a moving image capturing mechanism, a binocular telescope, a microscope, a surveying instrument, or the like.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

What is claimed is:

1. A lens barrel comprising:
a lens holding member that holds a lens;
a guide bar that includes a magnet in at least a portion thereof and that is oriented in a direction of an optical axis of the lens to guide the lens holding member to move in the direction of the optical axis; and
a control portion that is disposed on the lens holding member, and that includes a non-magnetic contact surface that contacts a portion of an outer circumferential surface of the guide bar and a magnetic body generating magnetic force between itself and the magnet of the guide bar arranged at a position further from the guide bar than the contact surface, wherein
a cross section of the guide bar in a direction orthogonal to the optical axis is substantially circular, and
an N pole and an S pole of the magnet are present in the cross section of the guide bar such that, on a surface of the magnet, the one of the N pole and the S pole that is further from the magnetic body occupies a larger portion of the circumference of the cross section than the other of the N pole and the S pole.

2. The lens barrel according to claim 1, wherein the N pole and the S pole are shaped as sectors on the cross section.

3. A lens barrel comprising:
a lens holding member that holds a lens;
a guide bar arranged in a direction of an optical axis of the lens to guide the lens holding member to move in the direction of the optical axis; and
a control portion that controls a position of the lens holding member relative to the guide bar, wherein
the control portion includes a magnetic body and a pair of contact surfaces that contact the guide bar,
the contact surfaces are two surfaces that intersect at an angle to form a shape that is substantially V-shaped,
the guide bar includes a magnet in at least a portion thereof and a magnetic yoke that covers at least a portion of the magnet, and
the magnetic yoke contacts a magnetic pole of the magnet that is further from the magnetic body and does not cover a portion of the magnet facing the magnetic body.

4. An image capturing device comprising the lens barrel according to claim 1.

5. An image capturing device comprising the lens barrel according to claim 3.

6. A method for moving a lens comprising:
holding a lens with a lens holding member;
guiding the lens holding member along a guide bar to move in a direction of the optical axis of the lens; and
controlling a position of the lens holding member relative to the guide bar, wherein the guide bar includes a magnet in at least a portion thereof and is oriented in a direction of an optical axis of the lens, the controlling is done by a control portion, disposed on the lens holding member, that includes a non-magnetic contact surface that contacts a portion of an outer circumferential surface of the guide bar and a magnetic body generating magnetic force between itself and the magnet of the guide bar arranged at a position further from the guide bar than the contact surface, a cross section of the guide bar in a direction orthogonal to the optical axis is substantially circular, and an N pole and an S pole of the magnet are present in the cross section of the guide bar such that, on a surface of the magnet, the one of the N pole and the S pole that is further from the magnetic body occupies a larger portion of the circumference of the cross section than the other of the N pole and the S pole.

7. The method according to claim 6, wherein the N pole and the S pole are shaped as sectors on the cross section.

8. A method for moving a lens comprising:

holding a lens with a lens holding member;

guiding the lens holding member along a guide bar to move in a direction of the optical axis of the lens; and controlling a position of the lens holding member relative to the guide bar, wherein the controlling is done by a control portion including a magnetic body and a pair of contact surfaces that contact the guide bar, the contact surfaces are two surfaces that intersect at an angle to form a shape that is substantially V-shaped, the guide bar includes a magnet in at least a portion thereof and a magnetic yoke that covers at least a portion of the magnet, and the magnetic yoke contacts a magnetic pole of the magnet that is further from the magnetic body and does not cover a portion of the magnet facing the magnetic body.

9. A method for capturing an image using a lens, wherein the lens is moved by the method according to claim 6.

10. A method for capturing an image using a lens, wherein the lens is moved by the method according to claim 8.

* * * * *